United States Patent
Yamakawa et al.

(10) Patent No.: US 9,081,184 B2
(45) Date of Patent: Jul. 14, 2015

(54) HEAD-UP DISPLAY DEVICE FOR VEHICLE AND SELF-CHECKING METHOD THEREFOR

(71) Applicant: NIPPON SEIKI CO., LTD., Nagaoka, Niigata (JP)

(72) Inventors: Yasuhiro Yamakawa, Niigata (JP); Tsuyoshi Nakahara, Niigata (JP); Makoto Hada, Niigata (JP); Shun Sekiya, Niigata (JP); Kazuyoshi Yamada, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/374,843

(22) PCT Filed: Dec. 5, 2012

(86) PCT No.: PCT/JP2012/081550
§ 371 (c)(1),
(2) Date: Jul. 25, 2014

(87) PCT Pub. No.: WO2013/111458
PCT Pub. Date: Aug. 1, 2013

(65) Prior Publication Data
US 2015/0022898 A1    Jan. 22, 2015

(30) Foreign Application Priority Data

Jan. 27, 2012   (JP) ................. 2012-014800

(51) Int. Cl.
*G02B 27/14* (2006.01)
*G09G 5/00* (2006.01)
(Continued)

(52) U.S. Cl.
CPC ............ *G02B 27/0179* (2013.01); *B60K 35/00* (2013.01); *G01J 1/16* (2013.01);
(Continued)

(58) Field of Classification Search
CPC . G02B 27/01; G02B 27/0101; G02B 27/0149
USPC .............................. 359/630, 631, 633; 345/7
See application file for complete search history.

(56) References Cited

U.S. PATENT DOCUMENTS

| | | | |
|---|---|---|---|
| 2001/0008394 A1* | 7/2001 | Kanamori | ........................ 345/7 |
| 2003/0085849 A1 | 5/2003 | Grabert | |
| 2003/0085867 A1 | 5/2003 | Grabert | |

FOREIGN PATENT DOCUMENTS

| | | |
|---|---|---|
| JP | 7-270211 A | 10/1995 |
| JP | 2005-531790 A | 10/2005 |

(Continued)

OTHER PUBLICATIONS

English translation International Search Report PCT/JP2012/081550 dated Jan. 22, 2013.

*Primary Examiner* — William Choi
(74) *Attorney, Agent, or Firm* — McDermott Will & Emery LLP

(57) ABSTRACT

A head-up display device and a self-checking method therefor are provided, which are able to suppress the direct output of a laser beam to outside. A reflecting means reflects an image generated by a scanning means and projects the image outside of a case, and an angle-adjusting means adjusts the reflecting means to a desired angle. After the ignition switch of the vehicle is turned on, a light-emitting means outputs a scanning laser beam, and the value of the current flowing to the light-emitting means is detected, or a first light intensity, which is the light intensity of the scanning laser beam, is detected. For a period extending at least from the output of the scanning laser beam by the light-emitting means to the establishment of a predetermined condition, the angle-adjusting means is controlled such that the reflecting means is set to a non-visible position at which the scanning laser beam is reflected inside the case.

12 Claims, 10 Drawing Sheets

(51) Int. Cl.
  *G02B 27/01* (2006.01)
  *B60K 35/00* (2006.01)
  *G01J 1/16* (2006.01)
  *G01J 1/42* (2006.01)
(52) U.S. Cl.
  CPC .............. *G01J 1/4257* (2013.01); *G02B 27/01* (2013.01); *G02B 27/0101* (2013.01); *G02B 27/0149* (2013.01); *B60K 2350/2052* (2013.01); *G01J 2001/4247* (2013.01); *G02B 2027/0159* (2013.01); *G02B 2027/0198* (2013.01)

(56) References Cited

FOREIGN PATENT DOCUMENTS

| | | |
|---|---|---|
| JP | 2008-55940 A | 3/2008 |
| JP | 2011-209457 A | 10/2011 |

* cited by examiner (a)

(b)

(c)

(a)

(b)

(c)

HEAD-UP DISPLAY DEVICE FOR VEHICLE AND SELF-CHECKING METHOD THEREFOR

CROSS-REFERENCE TO RELATED APPLICATIONS

This application is the U.S. National Phase of PCT/JP2012/081550 filed Dec. 5, 2012, which claims priority from Japanese Patent Application No. 2012-014800 filed Jan. 27, 2012. The subject matter of each is incorporated herein by reference in entirety.

TECHNICAL FIELD

The present invention relates to a head-up display device for a vehicle which is mounted in an automobile or the like to display vehicle information by a virtual image, and uses a laser diode in a light source, and to a self-checking method therefor.

BACKGROUND ART

In the related art, various head-up display devices for a vehicle which projects a display image onto a windshield of a vehicle or a semi-transmission plate, called a combiner, and allows a vehicle driver to visually recognize a virtual image have been suggested. For example, as shown in FIG. 13, these head-up display devices for vehicles are provided in a dashboard of a vehicle, and irradiate display light L onto a windshield 2, thereby allowing a vehicle driver 3 to visually recognize a virtual image of a display image V and a landscape in a superimposing manner.

Regarding the head-up display devices for a vehicle, a head-up display device in which a semiconductor laser (LD: Laser Diode) is used as a light source has been suggested and disclosed in, for example, PTL 1. This head-up display device for a vehicle includes an LD which is a light source, a screen, and a scanning system which scans laser light on the screen to generate a display image.

CITATION LIST

Patent Literature

[PTL 1] JP-A-7-270711

SUMMARY OF INVENTION

Technical Problem

However, the laser scanning type head-up display device for a vehicle needs to use laser light having light intensity of about Class 3B. For example, when the screen is damaged, there is a concern that laser light is incident on the eyes of the vehicle driver and adversely affects the eyes of the vehicle driver.

Accordingly, the invention has been accomplished in consideration of the above-described problem, and an object of the invention is to provide a head-up display device for a vehicle and a self-checking method therefor capable of suppressing the output of laser light directly to the outside.

Solution to Problem

Accordingly, the invention has introduced the following means in order to solve the above-described problem.

That is, according to the invention, after a start switch of a vehicle is turned on, light emitting means emits test laser light during driving for a test, and a current value in the light emitting means or light intensity of laser light is detected. At least until the safety of the light emitting means can be confirmed after test laser light is emitted, angle adjustment of reflection means is performed to prevent test laser light from being emitted to the outside.

In order to solve the above-described problem, according to a first aspect of the invention, there is provided a head-up display device for a vehicle which projects an image from a light transmission portion, the head-up display device including a housing which has the light transmission portion, light emitting means for outputting laser light, scanning means for scanning the laser light from the light emitting means to generate the image, reflection means for reflecting the image generated by the scanning means to project the image outside the housing, angle adjustment means for adjusting the reflection means at a desired angle, test laser light output means for causing the light emitting means to output test laser light based on test laser light output data recorded in the recording means in advance after a start switch of the vehicle is turned on, light source state detection means for detecting a current value in the light emitting means or first light intensity, which is light intensity of the test laser light, when the light emitting means emits the test laser light, and invisible position holding means for controlling the angle adjustment means such that the position of the reflection means is an invisible position at which the test laser light is reflected inside the housing at least until a predetermined condition is established after the light emitting means outputs the test laser light. With this configuration, when testing the light emitting means which emits laser light, since laser light output from the light emitting means is reflected inside the housing by the reflection means, it is possible to prevent laser light from being directly incident on the eyes of the vehicle driver and from adversely affecting the eyes of the vehicle driver.

According to a second aspect of the invention, the head-up display device for a vehicle may further include first invisible position adjustment means for performing angle adjustment of the reflection means to a first invisible position, which is the invisible position, when the start switch of the vehicle is turned off, in which the invisible position holding means may hold the position of the reflection means at the first invisible position. With this configuration, when the start switch is turned on and the head-up display device for a vehicle starts, since the reflection means is already located at an invisible position at which laser light is not reflected to the outside, there is no case where laser light is emitted to the outside even if test laser light is output immediately, and it is possible to start a test without delay.

According to a third aspect of the invention, the head-up display device for a vehicle may further include first invisible position adjustment means for performing angle adjustment of the reflection means to a first invisible position, which is the invisible position, when the start switch of the vehicle is turned off, in which the invisible position holding means performs angle adjustment for the position of the reflection means from the first invisible position to a second invisible position different from the first invisible position within the invisible position. With this configuration, when the start switch is turned on and the head-up display device for a vehicle starts, since the reflection means is already located at an invisible position at which laser light is not reflected to the outside, there is no case where laser light is emitted to the outside even if test laser light is output immediately, and it is possible to start a test without delay.

According to a fourth aspect of the invention, the angle adjustment means may read angle adjustment data recorded in the recording means in advance with a predetermined origin as a reference and may perform angle adjustment for the reflection means to a desired position, and the origin may be the first invisible position. With this configuration, since the first invisible position at which the reflection means is located when the start switch of the vehicle is turned on is the origin of angle adjustment of the reflection means, if the start switch of the vehicle is turned on, it is possible to test the light emitting means without delay and to detect the origin for angle adjustment of the reflection means, and thereafter, to accurately perform the angle adjustment of the reflection means.

According to a fifth aspect of the invention, the angle adjustment means may read angle adjustment data recorded in the recording means in advance with a predetermined origin as a reference and may perform angle adjustment for the reflection means to a desired position, and the origin may be the second invisible position. With this configuration, when the start switch of the vehicle is turned on, it is possible to detect the origin of the reflection means while maintaining the reflection means at an invisible position at which laser light is not reflected to the outside.

According to a sixth aspect of the invention, the second invisible position is a position in a direction opposite to the shortest direction from a visible position, at which the reflection means reflects the image in the light transmission portion direction, to the first invisible position. With this configuration, when testing the light emitting means, it is possible to adjust the reflection means at a position at which laser light is less reflected to the outside.

According to a seventh aspect of the invention, the head-up display device for a vehicle may further include current correction value recording means for comparing the current value or the first light intensity detected by the light source state detection means with a reference current value or a first reference light intensity for a model recorded in the recording means in advance to obtain a current correction value and recording the current correction value in the recording means. Therefore, when testing the light emitting means, it is possible to safely correct light intensity of laser light output from the light emitting means without emitting laser light to the outside.

According to an eighth aspect of the invention, the head-up display device may further include test scanning means for driving the scanning means for a test based on test scanning data recorded in the recording means in advance after the start switch of the vehicle is turned on, driving frequency detection means for detecting a horizontal driving frequency and a vertical driving frequency of the scanning means when the scanning means is driven for the test, and frequency correction value recording means for comparing the horizontal driving frequency and the vertical driving frequency detected by the driving frequency detection means with a reference horizontal driving frequency and a reference vertical driving frequency for models recorded in the recording means in advance to obtain a frequency correction value and recording the frequency correction value in the recording means. With this configuration, it is possible to safely correct the driving frequency of the scanning means without emitting laser light to the outside.

According to a ninth aspect of the invention, the head-up display device may further include misalignment detection image generation means for driving the light emitting means and the scanning means based on misalignment detection image data recorded in the recording means in advance after the start switch of the vehicle is turned on and generating a misalignment detection image on a screen, second light intensity detection means for detecting second light intensity which is light intensity of a predetermined location of the misalignment detection image, and misalignment correction value recording means for comparing the second light intensity detected by the second light intensity detection means with a second reference light intensity for a model recorded in the recording means in advance to obtain a misalignment correction value and recording the misalignment correction value in the recording means. With this configuration, it is possible to safely correct misalignment when a display image is projected without emitting laser light to the outside.

According to a tenth aspect of the invention, there is provided a self-checking method in a head-up display device for a vehicle which scans laser light output from light emitting means by scanning means to generate an image, and reflects and projects the image by reflection means, the self-checking method including a test laser light output step of causing the light emitting means to output test laser light based on test laser light output data recorded in recording means in advance after a start switch of the vehicle is turned on, a light source state detection step of detecting a current value in the light emitting means or first light intensity of the test laser light when the light emitting means outputs the test laser light, a current correction value recording step of comparing the current value or the first light intensity detected in the light source state detection step with a reference current value or first reference light intensity for a model recorded in the recording means in advance to obtain a current correction value and recording the current correction value in the recording means, and an invisible position holding step of controlling angle adjustment means such that the position of the reflection means is an invisible position, at which the test laser light is reflected inside a housing at least until a predetermined condition is established after the light emitting means outputs the test laser light. With this method, when testing the light emitting means which emits laser light, since laser light output from the light emitting means is reflected inside the housing by the reflection means, it is possible to prevent laser light from being directly incident on the eyes of the vehicle driver and from adversely affecting the eyes of the vehicle driver. Furthermore, it is possible to correct light intensity of laser light output from the light emitting means without emitting laser light to the outside.

According to an eleventh aspect of the invention, the self-checking method may further include, before the test laser light output step after the start switch of the vehicle is turned on, a test scanning step of driving the scanning means for a test based on test scanning data recorded in the recording means in advance after the start switch of the vehicle is turned on, a frequency detection step of detecting a horizontal driving frequency and a vertical driving frequency of the scanning means when the scanning means is driven for a test, and a frequency correction value recording step of comparing the horizontal driving frequency and the vertical driving frequency detected by the frequency detection means with a reference horizontal driving frequency and a reference vertical driving frequency for models recorded in the recording means in advance to obtain a frequency correction value and recording the frequency correction value in the recording means. With this configuration, it is possible to safely correct the driving frequency of the scanning means without emitting laser light to the outside.

According to a twelfth aspect of the invention, the self-checking method may further include, after the test laser light output step, a misalignment detection image generation step of driving the light emitting means and the scanning means based on misalignment detection image data recorded in the recording means in advance and generating a misalignment detection image on a screen, a second light intensity detection step of detecting second light intensity which is light intensity of a predetermined location of the misalignment detection image, and a misalignment correction value recording step of comparing the second light intensity detected by the second light intensity detection means with a second reference light intensity for a model recorded in the recording means in advance to obtain a misalignment correction value and recording the misalignment correction value in the recording means. With this configuration, it is possible to safely correct misalignment when a display image is projected without emitting laser light to the outside.

Advantageous Effects of Invention

A head-up display device and a self-checking method therefor capable of suppressing the output of laser light directly to the outside are provided.

DESCRIPTION OF EMBODIMENTS

Figure 1:
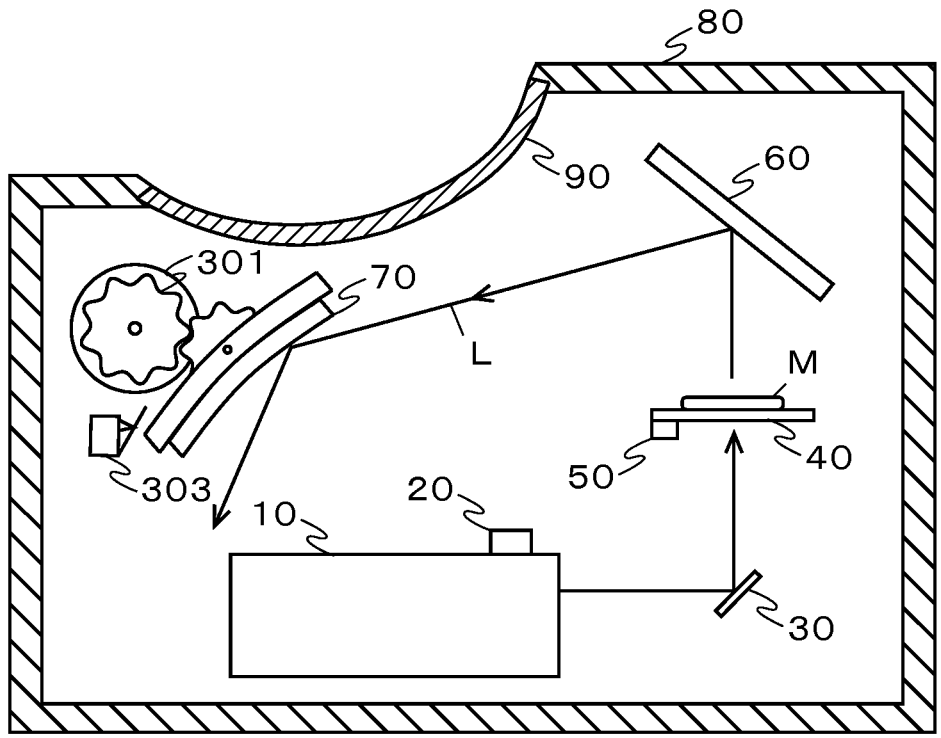
FIG. 1 is a side view of a head-up display device for a vehicle of the invention.

Hereinafter, an embodiment of the invention will be described referring to the drawings. First, FIG. 1 is a side view of a head-up display device 1 for a vehicle of this embodiment, and FIG. 2 is an explanatory view of light emitting means of this embodiment.

As shown in FIG. 1, the head-up display device 1 for a vehicle includes light emitting means 10 for outputting laser light RGB, a color sensor (first light intensity detection means) 20 which receives the laser light RGB as input and detects first light intensity, which is light intensity of each of the laser light RGB, scanning means 30 for scanning the laser light RGB toward a screen 40, the screen 40 on which a display image M is projected by the scanned light, a photosensor (second light intensity detection means) 50 which is provided on the screen 40 and detects second light intensity, which is light intensity of the laser light RGB scanned by the scanning means 30, a planar mirror 60 which turns display light L representing the display image M projected on the screen 40 to a concave mirror 70, the concave mirror 70 which emits the display light L to a windshield 2, a housing 80 which accommodates the light emitting means 10, the color sensor 20, the scanning means 30, the screen 40, the photosensor 50, the planar mirror 60, and the concave mirror 70, and a light transmission portion 90 which is provided in a part of the housing 80. The display light L emitted from the head-up display device 1 for a vehicle is reflected by the windshield 2 and visually recognized as a virtual image V by the vehicle driver 3.

Figure 2:
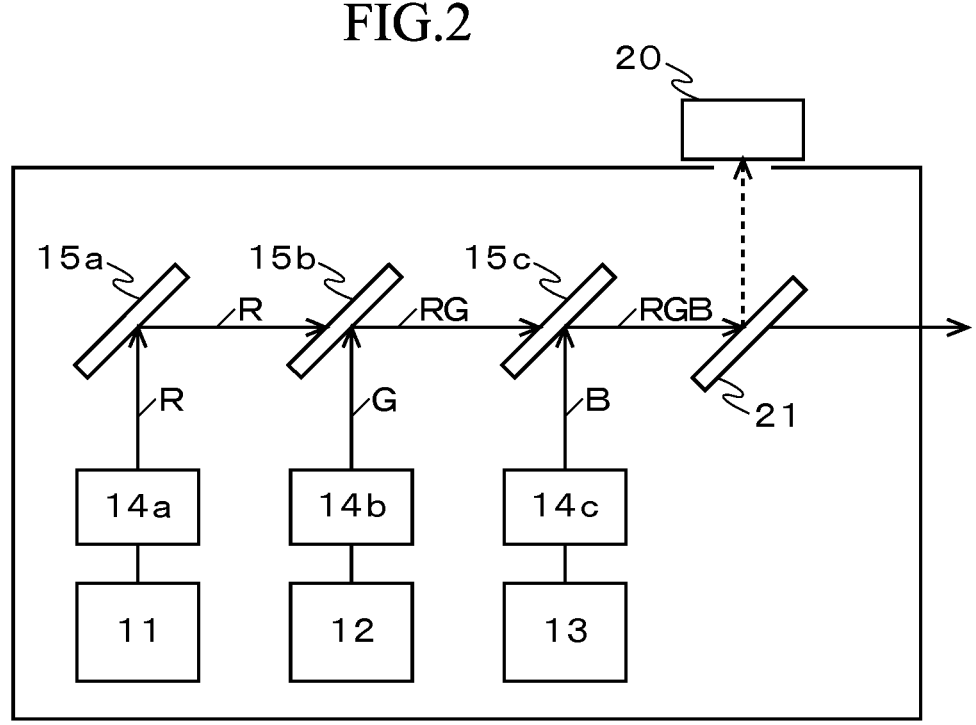
FIG. 2 is an explanatory view of light emitting means in the head-up display device for a vehicle of the invention.

As shown in FIG. 2, the light emitting means 10 includes laser diodes (hereinafter, referred to as LDs) 11, 12, and 13, a condensing optical system 14, and multiplexing means 15. The light emitting means 10 multiplexes laser light R, G, and B output from the LDs 11, 12, and 13 and outputs the laser light R, G, and B as single laser light RGB.

The LDs 11, 12, and 13 have a red LD 11 which emits red laser light R, a green LD 12 which emits green laser light G, and a blue LD 13 which emits blue laser light B, and the light emission intensity and light emission timing thereof are adjusted separately based on LD driving signals from an LD control unit 100 described below.

The condensing optical system 14 reduces the spot diameter of the laser light RGB using a lens and the like to form convergent light, and includes a red condenser 14a which condenses the red laser light R, a green condenser 14b which condenses the green laser light G, and a blue condenser 14c which condenses the blue laser light B.

The multiplexing means 15 has a dichroic mirror which reflects light having a specific wavelength and transmits light having a different wavelength, or the like, and includes a first multiplexer 15a which reflects the red laser light R, a second multiplexer 15b which transmits the red laser light R and reflects the green laser light G, and a third multiplexer 15c which transmits the red laser light R and the green laser light G and reflects the blue laser light B.

With this configuration, the light emitting means 10 outputs a plurality of beams of laser light RGB with desired light intensity based on the LD driving signals from the LD control unit 100 described below, converts each beam of laser light RGB to convergent light by the condensing optical system 14, and outputs the respective beams of the laser light RGB as the single laser light RGB by the multiplexing means 15.

The light emitting means 10 includes a transmission film 21 which is provided on the optical path of the laser light RGB, and the color sensor 20 which is provided in the reflection direction of the laser light RGB by the transmission film 21.

The transmission film 21 has a transmissive member having reflectance of about 5%. The transmission film 21 transmits laser light RGB and reflects a part of the laser light RGB toward the color sensor 20.

The color sensor (first light intensity detection means) 20 receives a part of the laser light RGB reflected from the transmission film 21, detects first light intensity (red light intensity Ir of the red laser light R, green light intensity Ig of the green laser light G, and blue light intensity Ib of the blue laser light B) of the laser light RGB, and outputs the first light intensity to a general control unit 400 described below through an A/D converter.

Since it should suffice that the first light intensity detection means 20 can detect light intensity, the first light intensity detection means 20 may have photodiodes which are provided at locations, at which the red laser light R, the green laser light G, and the blue laser light B can be detected, instead of the optical path of the laser light RGB, or the like.

The scanning means 30 is a MEMS (Micro Electro Mechanical System) mirror. The scanning means 30 receives the laser light RGB from the light emitting means 10, and scans the laser light RGB to the screen 40 based on a scanning means control signal from a scanning means control unit 200 described below to generate a display image M on the screen 40.

Figure 3:
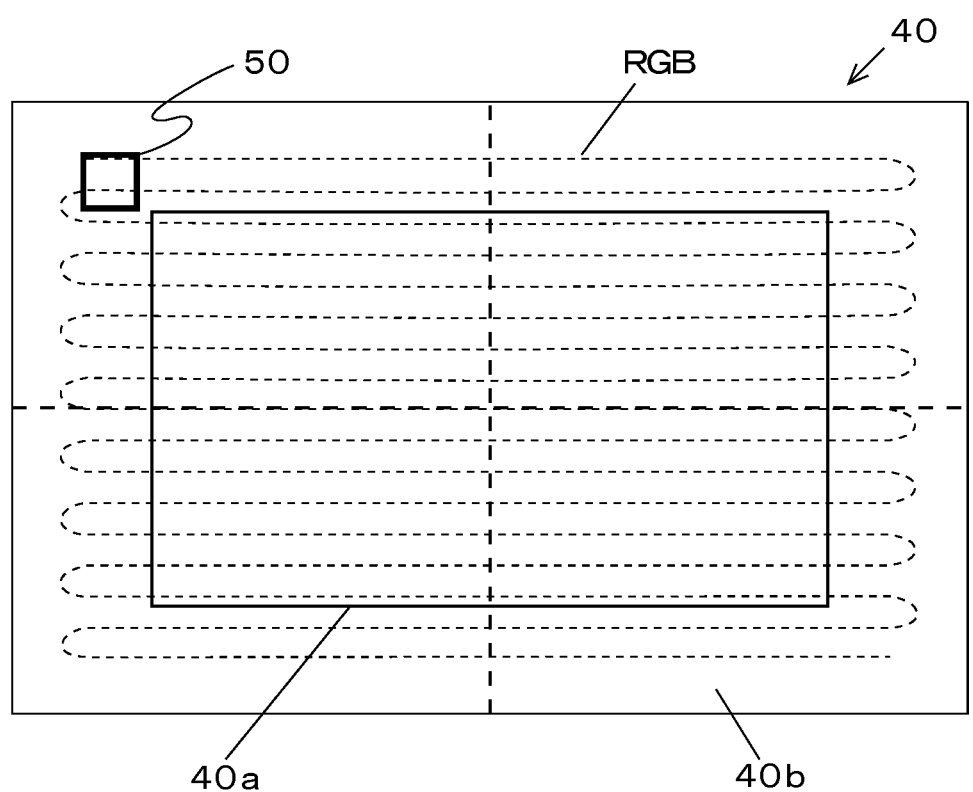
FIG. 3 is an explanatory view showing a mode in which an image is scanned on a screen in the head-up display device for a vehicle of the invention.

The screen 40 receives, transmits, and diffuses the display image M from the MEMS mirror 30 on the rear surface, and displays the display image M on the front surface. The screen 40 has, for example, a holographic diffuser, a microlens array, a polarizing plate, or the like. As shown in FIG. 3, the screen 40 is classified into a display area 40a which is reflected by the planar mirror 60 and visually recognized as a virtual image V by the vehicle driver 3 and a non-display area 40b which is not reflected by the planar mirror 60.

The photodiode (second light intensity detection means) 50 is provided inside the region of the non-display area 40b of the screen 40 on the MEMS mirror 30 side of the screen 40 and a region which can be scanned by the MEMS mirror 30, and detects light intensity of the synthesized laser light RGB scanned by the MEMS mirror 30.

The photodiode 50 outputs second light intensity, which is the detected light intensity, as an analog signal, converts the analog signal to a digital signal through an A/D converter, and outputs the digital signal to the general control unit 400 described below.

The sampling frequency of the photodiode 50 and the modulation frequency of each of the LDs 11, 12, and 13 are synchronized with each other, and the general control means 400 calculates a misalignment correction value of the position of the display image M which is actually projected on the screen 30 by the MEMS mirror 20 and a target position desired to project the display image M from the detection timing of second reference light intensity of each of the LDs 11, 12, and 13 recorded in a recording unit 402 in advance and the detection timing of the second light intensity detected by the photodiode 50. The misalignment correction value is output to the general control unit 400 described below and recorded in the recording means 402, and misalignment is corrected (misalignment correction value recording means).

The planar mirror 60 is a planar mirror which turns the display light L of the display image M projected on the front surface of the screen 40 toward the concave mirror 70.

The concave mirror 70 is a concave mirror which emits the display light L reflected by the planar mirror 60 toward the wind mirror 2 of the vehicle through the light transmission portion 90.

The concave mirror 70 has a motor 301 for angle adjustment mounted therein, and the motor 301 is driven based on a reflection means control signal from a reflection means control unit 300 described below, thereby adjusting the reflection direction of the display light L.

The housing 80 accommodates the light emitting means 10, the color sensor 20, the MEMS mirror 30, the screen 40, the photodiode 50, the planar mirror 60, the concave mirror 70, and the like, and is formed of a light shielding member. Although the below-described general control unit 400 which performs electrical control of the head-up display device 1 for a vehicle is provided inside the housing 80, the general control unit 400 may be provided outside the head-up display device 1 for a vehicle and may be electrically connected to the head-up display device 1 for a vehicle by wiring.

The light transmission portion 90 is fitted to the housing 80 described below, is made of a light transmissive resin, such as acryl, and has a curved shape such that external light from the outside of the head-up display device 1 for a vehicle is not reflected toward the vehicle driver 3.

Figure 4:
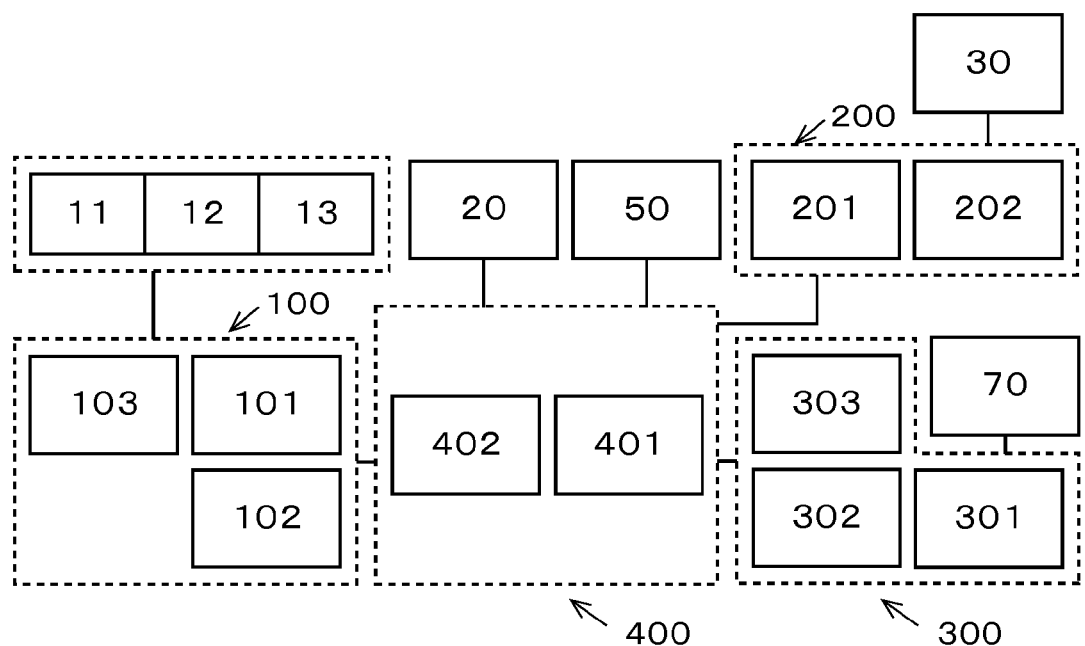
FIG. 4 is a configuration diagram of the head-up display device for a vehicle of the invention.

The configuration of the head-up display device 1 for a vehicle of this embodiment is as described above, and from this, control of the head-up display device 1 for a vehicle of this embodiment will be described referring to FIG. 4.

The control configuration in the head-up display device 1 for a vehicle includes the LD control unit 100 which drives the LDs 11, 12, and 13, the scanning means control unit 200 which drives the MEMS mirror 30, the reflection means control unit 300 which drives the motor 301 attached to the concave mirror 70 and moves and rotates the concave mirror 70, and the general control unit 400 which controls the LD control unit 100, the scanning means control unit 200, and the reflection means control unit 300.

The LD control unit 100 includes LD output control means 101 which has an LD driver circuit for turning on the red LD 11, the green LD 12, and the blue LD 13, LD current detection means 102, and LD power supply means 103 which has a power supply circuit configured to supply power to the LDs 11, 12, and 13. The LD power supply means 103 may be provided separately for each of the red LD 11, the green LD 12, and the blue LD 13, or the LD power supply means 103 may be shared by a plurality of LDs.

The LD output control means 101 receives LD control data output from the general control unit 400 described below as input, and performs PWM (Pulse Width Modulation) control or PAM (Pulse Amplitude Modulation) control based on LD control data for each of the LDs 11, 12, and 13.

The LD output control means 101 receives LD current data representing a current value in each of the LDs 11, 12, and 13 from the LD current detection means 102 described below as input, performs determination about abnormality, such as overcurrent, and outputs an LD current error signal based on the determination about abnormality to the general control unit 400 described below.

The LD current detection means 102 detects the current value in each of the red LD 11, the green LD 12, and the blue LD 13 and outputs LD current data representing the current value to the LD output control means 101. Although the LD current detection means 102 constantly detects the current value in each of the LDs 11, 12, and 13, the current value may be detected only during predetermined operation of the head-up display device 1 for a vehicle or may be detected for every predetermined period.

In this embodiment, although the LD output control means 101 performs the determination about abnormality of LD current data, LD current data from the LD current detection means 102 may be output to the general control unit 400 described below and determination about abnormality of LD current data may be performed by the general control unit 400, or determination about abnormality may be performed by both of the LD output control unit 101 and the general control unit 400.

The LD power supply means 103 supplies power to the LDs 11, 12, and 13 through the LD output control means 101, and the power supply is turned on/off by an instruction of the general control unit 400 described below. When abnormality, such as an LD current error, is detected, the power supply is turned off based on an LD power supply stop signal from the general control unit 400. When the turn-off of the power supply is completed, a power supply turn-off completion signal may be output to the general control unit 400.

Next, the scanning means control unit 200 will be described.

The scanning means control unit 200 includes MEMS mirror driving means 201 for driving the MEMS mirror 30, and mirror position detection means 202 for detecting the position of the MEMS mirror 30.

The MEMS mirror driving means 201 has a drive circuit of the MEMS mirror 30, and drives the MEMS mirror 30 based on MEMS mirror control data from the general control unit 400.

The MEMS mirror driving means 201 receives scanning position detection data output from the mirror position detection means 202 after driving the MEMS mirror 30 as input, calculates feedback data from the scanning position detection data, and outputs feedback data to the general control unit 400.

Feedback data output from the MEMS mirror driving means 201 is data, such as an actual resonance frequency which is the resonance frequency of a piezoelectric elements when the mirror of the MEMS mirror 30 is actually moved in a horizontal direction or an actual vertical driving frequency which is the horizontal frequency of the piezoelectric element when the mirror is actually moved in the horizontal direction.

The mirror position detection means 202 detects the shaking position for every time of the piezoelectric element, which moves the mirror of the MEMS mirror 30, and outputs the shaking position as scanning position detection data to the MEMS mirror driving means 201.

Next, the reflection means control unit 300 will be described.

The reflection means control unit 300 includes the motor 301 which adjusts the angle of the concave mirror 70, a motor driving unit 302 which drives the motor 301, and a concave mirror state detection unit 303 which detects the angle of the concave mirror 70. The motor driving unit 302 drives the motor 301 based on angle adjustment data from the general control unit 400, and the concave mirror 70 is adjusted at a desired angle.

The motor 301 has an actuator, such as a stepping motor, which adjusts the angle of the concave mirror 70 based on a driving signal from the motor driving unit 302.

An angle region where the motor 301 can adjust the concave mirror 70 is classified into a visible position at which the concave mirror 70 irradiates the display light L from the light transmission portion 90 to the outside, and an invisible position at which the concave mirror 70 does not irradiate the display light L from the light transmission portion 90 to the outside.

Figure 5:
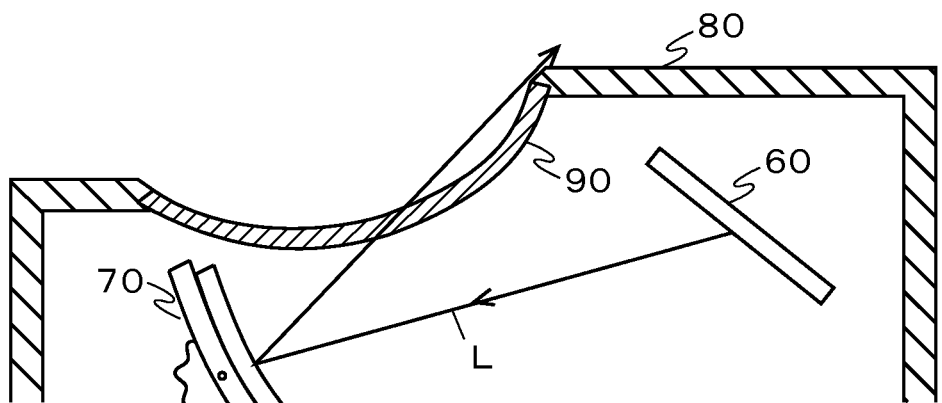
FIG. 5 is an explanatory view illustrating a visible position of reflection means in the head-up display device for a vehicle of the invention.
Figure 5:
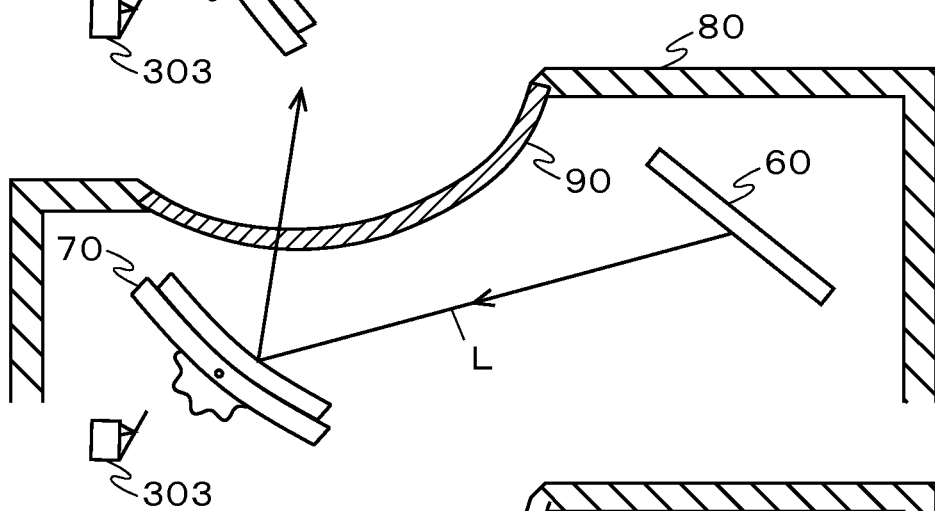
Figure 5:
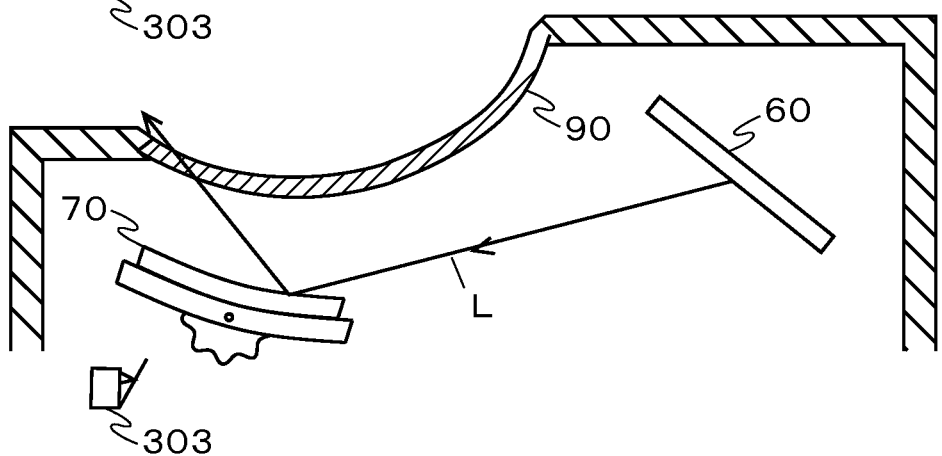

The visible position is the angle position of the concave mirror 70 during normal operation of the head-up display device 1 for a vehicle of this embodiment shown in FIG. 5(*b*) or an angle position shown in FIG. 5 (*a*) or 5 (*c*) at which the concave mirror 70 irradiates the display light L from the light transmission portion 90 to the outside.

The angle of the concave mirror 70 is adjusted by operation of a pushbutton switch (not shown) mounted in the vehicle within the visible position, thereby adjusting a position at which the display light L is projected on the windshield 2 (a position at which the virtual image V is visually recognized).

Figure 6:
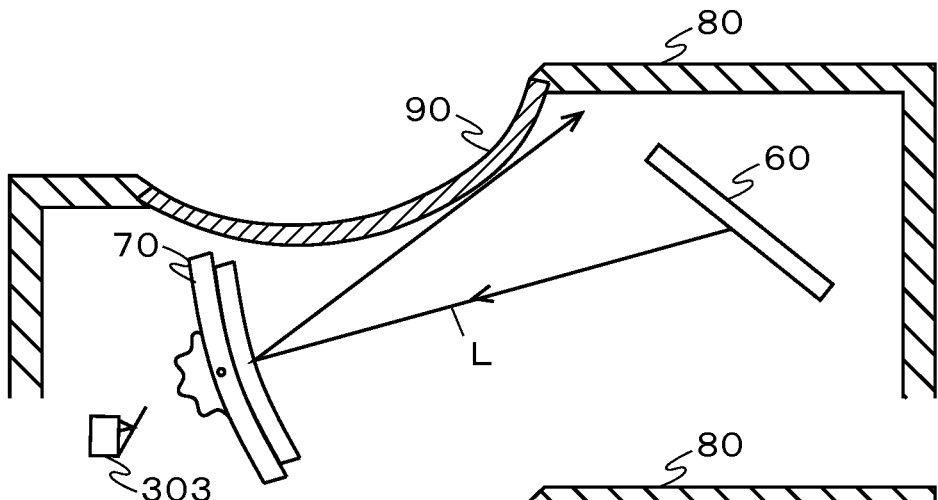
FIG. 6 is an explanatory view of an invisible position of the reflection means in the head-up display device for a vehicle of the invention.
Figure 6:
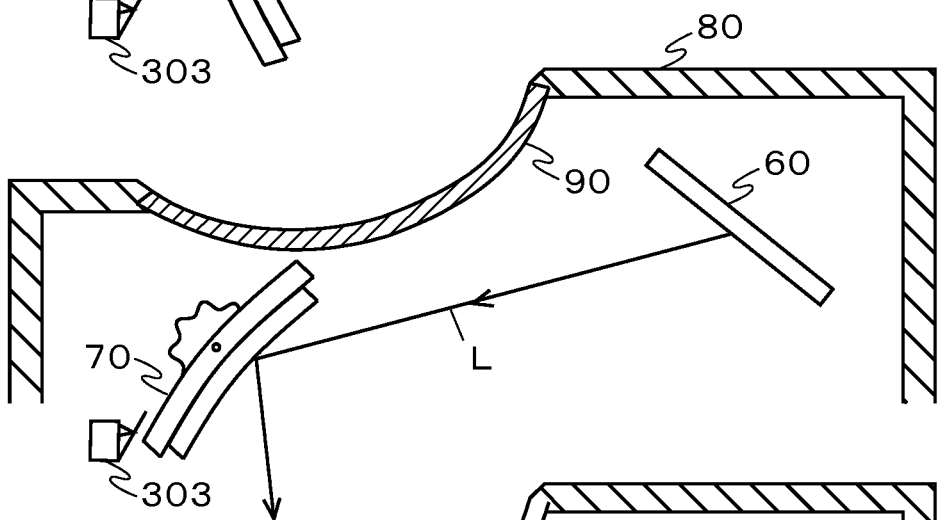
Figure 6:
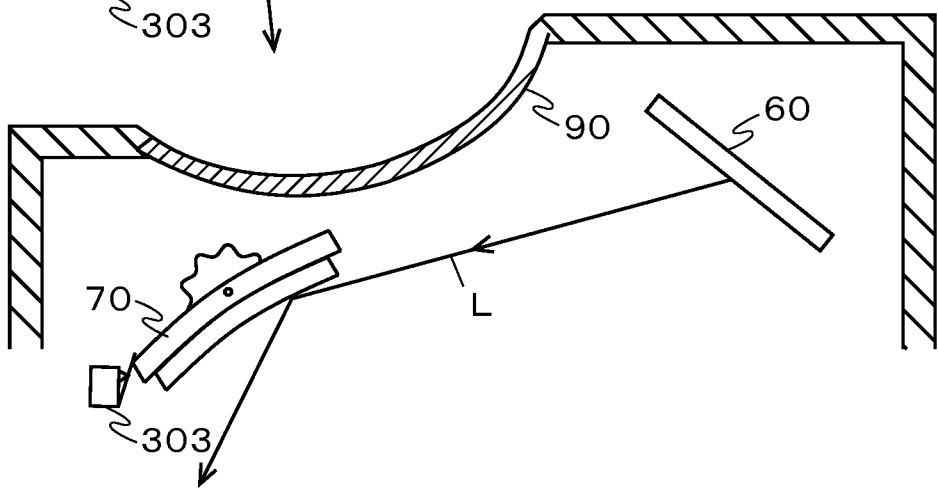

The invisible position is the angle position of the concave mirror 70 during a self-checking process SC of the head-up display device 1 for a vehicle of this embodiment or when abnormality occurs, and an angle shown in FIGS. 6(*a*) to 6(*c*) at which the concave mirror 70 does not irradiate the display light L from the light transmission portion 90.

In the head-up display device 1 for a vehicle of this embodiment, in regard to the motor 301, although a motor which adjusts the angle of the concave mirror 70 between the visible position and the invisible position and a motor which adjusts the projection position of the display light L on the windshield 2 within the visible position are described as a common motor, these motors may be provided separately.

In this embodiment, although the motor 301 adjusts the angle of the concave mirror 70, the motor 301 may move the concave mirror 70 to the visible position and the invisible position.

The motor driving unit 302 is a driver circuit of a stepping motor, and drives the motor 301 based on angle adjustment data output from the general control unit 400.

Angle adjustment data is data for angle adjustment with a predetermine origin of the concave mirror 70 described below as a reference, and is recorded in the recording means 402 in advance.

As shown in FIG. 6(*c*), the concave mirror state detection unit 303 is a mechanical switch which detects whether or not the concave mirror 70 is at the origin, and detects contact or press at one point of the concave mirror 70. The concave mirror state detection unit 303 outputs an origin detection signal to the general control unit 400 when the concave mirror 70 is adjusted to the origin and one point of the concave mirror 70 comes into contact with or is pressed against the concave mirror state detection unit 303.

In this embodiment, although the concave mirror state detection unit 303 only detects whether or not the concave mirror 70 is at the origin, angle detection of the concave mirror 70 may be performed using an angle sensor or the like.

Next, the general control unit 400 will be described.

The general control unit 400 has a microcomputer, an FPGA (Field Programmable Gate Array), an ASIC, or the like, and includes a CPU 401 which controls the LD control unit 100, the scanning means control unit 200, and the reflection means control unit 300, and the recording means 402 which has an EEPROM, Flash, or the like and records a program for driving the CPU 401 or data.

The general control unit 400 receives, as input, vehicle information or a start signal from a vehicle ECU (not shown), an LD current error signal representing abnormality of an LD from the LD control unit 100, LD current data representing the current value in each of the LDs 11, 12, and 13, first light intensity data from the first light intensity detection means 20, second light intensity data from the second light intensity detection means 50, feedback data from the scanning means control unit 200, a MEMS mirror error signal representing an operation error of the MEMS mirror 30, and the origin detection signal from the reflection means control unit 300 representing that the concave mirror 70 is at the origin position, generates and outputs LD driving data for driving the LD control unit 100, scanning means control data for driving the scanning means control unit 200, and angle adjustment data for driving the reflection means control unit 300 from these kinds of information, and performs general control of the head-up display device 1 for a vehicle of this embodiment.

Figure 7:
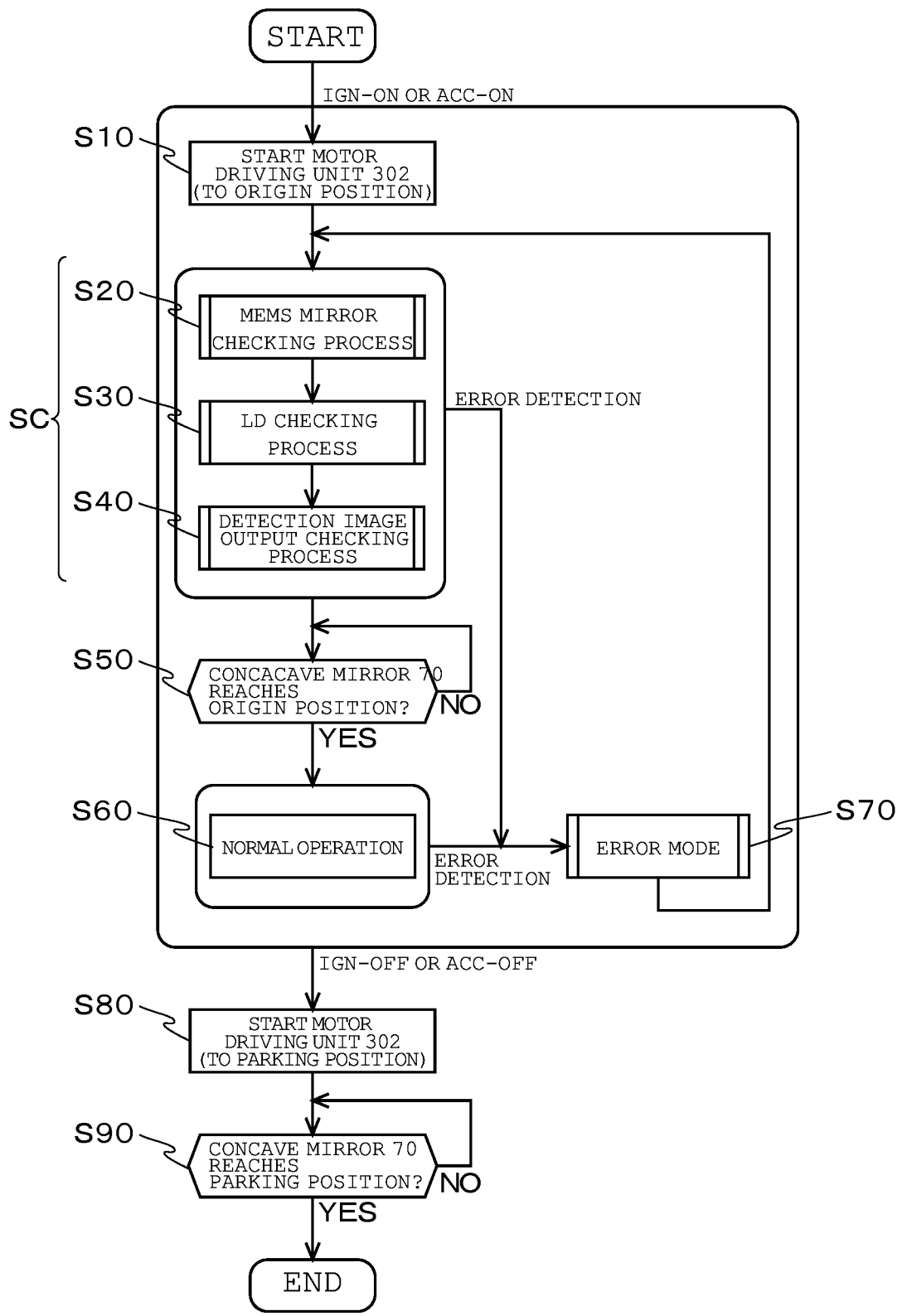
FIG. 7 is an operation flowchart of the head-up display device for a vehicle of the invention.

The control configuration of the head-up display device 1 for a vehicle of this embodiment is as described above, and next, an operation process of the head-up display device 1 for a vehicle of this embodiment will be described referring to FIG. 7.

If the start switch (ignition (hereinafter, referred to as IGN) or an accessory (hereinafter, referred to as ACC), key unlocking) of the vehicle is turned on, the head-up display device 1 for a vehicle of this embodiment starts.

In Step S10, the CPU 401 controls the motor 301 through the motor driving unit 302 to start angle adjustment of the concave mirror 70 from a first invisible position (Parking position (hereinafter, referred to as P position)) X to a second invisible position (origin position) Y.

The P position (first invisible position) X is the angle of the concave mirror 70 such that external light from the outside of the head-up display device 1 for a vehicle is incident from the light transmission portion 90 and is not reflected toward the planar mirror 60 or the screen 40 by the concave mirror 70, an angle at which the concave mirror 70 is set when the start switch of the vehicle is turned off. The P position X is also an invisible position at which the concave mirror 70 does not irradiate the display light L from the light transmission portion 90 to the outside.

The origin position (second invisible position) Y is the angle of the concave mirror 70 as a reference when performing angle adjustment of the concave mirror 70, and angle adjustment data stored in the recording means 402 is data for angle adjustment with the origin position Y as a reference. The origin position Y is also an invisible position at which the concave mirror 70 does not irradiate the display light L from the light transmission portion 90 to the outside.

If the concave mirror 70 starts to operate, the CPU 401 starts the self-checking process SC.

The self-checking process SC has a MEMS mirror checking process S20, an LD checking process S30, and a photodiode checking process S40.

(MEMS Mirror Checking Process)

Figure 8:
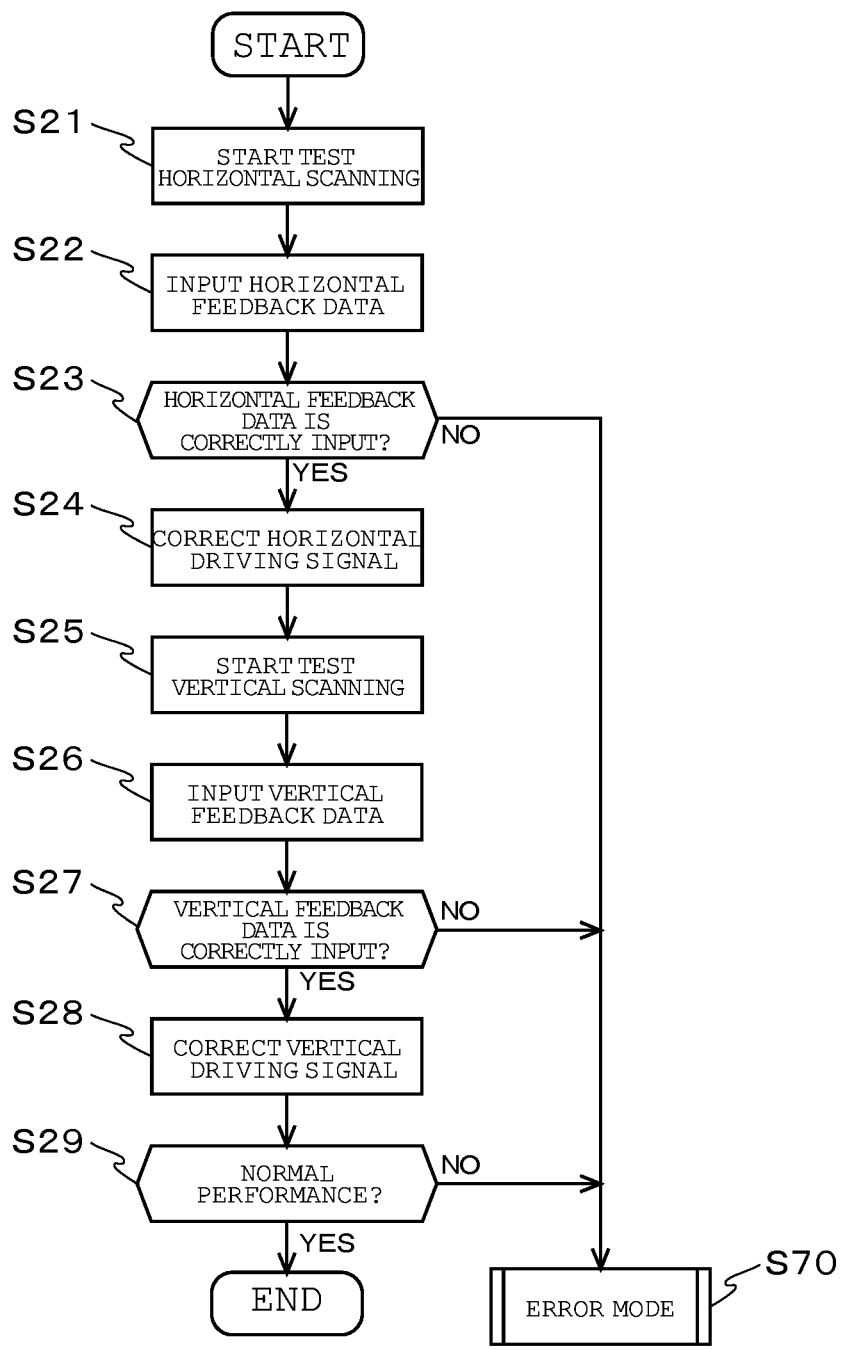
FIG. 8 is a flowchart of a MEMS mirror checking process of the head-up display device for a vehicle of the invention.

In the MEMS mirror checking process S20, correction of a horizontal driving signal and a vertical driving signal of the MEMS mirror 30 and error detection of the MEMS mirror 30 are performed (FIG. 8).

First, error checking and correction of the horizontal driving signal in the horizontal driving of the MEMS mirror 30 are performed (test scanning means).

In Step S21, the CPU 401 reads test scanning means driving data recorded in the recording means 402 in advance and starts test horizontal scanning of the MEMS mirror 30 through the MEMS mirror driving means 201 (test scanning means).

In Step S22, the CPU 401 receives, as input, horizontal feedback data (actual horizontal driving frequency (actual resonance frequency)) output from the MEMS mirror driving means 201 as digital data through an A/D conversion circuit.

In Step S23, the CPU 401 performs determination about whether or not the actual resonance frequency can be correctly input, and when it is determined to be abnormal, the CPU 401 progresses to an error mode S70.

In Step S24, the CPU 401 compares the actual resonance frequency with a reference horizontal driving frequency recorded in the recording means 402 in advance, calculates a frequency correction value, records the frequency correction value in the recording means 402, and corrects the horizontal driving signal (resonance frequency) of the MEMS mirror 30 (frequency correction value recording means).

Next, error checking and correction of the vertical driving signal in the vertical driving of the MEMS mirror 30 are performed.

In Step S25, the CPU 401 reads test scanning means driving data recorded in the recording means 402 in advance and starts test vertical scanning of the MEMS mirror 30 through the MEMS mirror driving means 201 (test scanning means).

In Step S26, the CPU 401 receives, as input, vertical feedback data (actual vertical driving frequency) output from the MEMS mirror driving means 201 as digital data through an A/D conversion circuit.

In Step S27, the CPU 401 performs determination about whether or not the actual vertical driving frequency can be correctly input, and when it is determined to be abnormal, the CPU 401 progresses to the error mode S70.

In Step S28, the CPU 401 compares the actual vertical driving frequency with a reference vertical driving frequency, calculates a frequency correction value, records the frequency correction value in the recording means 402, and corrects the vertical driving signal of the MEMS mirror 30 (frequency correction value recording means).

In Step S29, the determination unit 400 compares horizontal feedback data and vertical feedback data with a normal operation determination reference value recorded in the recording means 402 in advance, performs determination about normality/abnormality, and when it is determined to be abnormal, process progresses to the error mode S70.

(LD Checking Process)

Figure 9:
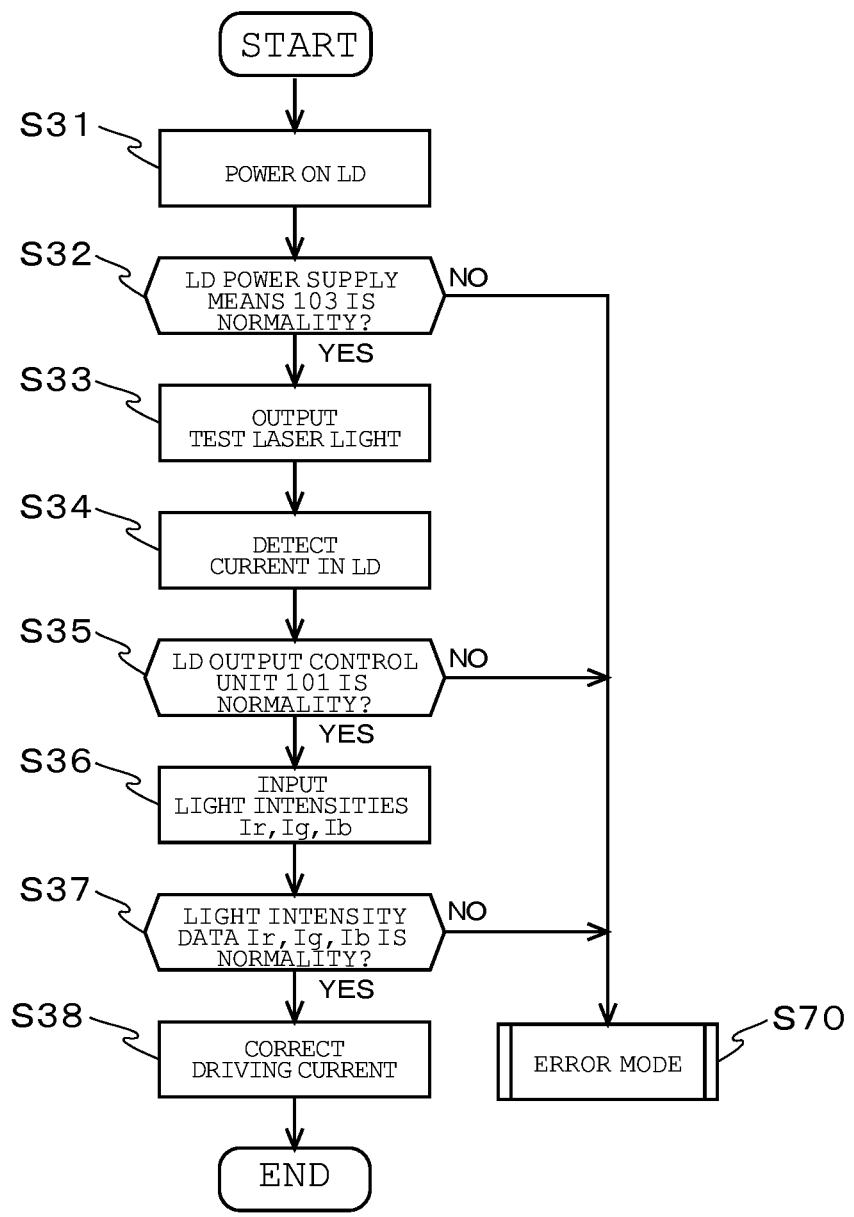
FIG. 9 is a flowchart of an LD checking process of the head-up display device for a vehicle of the invention.
Figure 10:
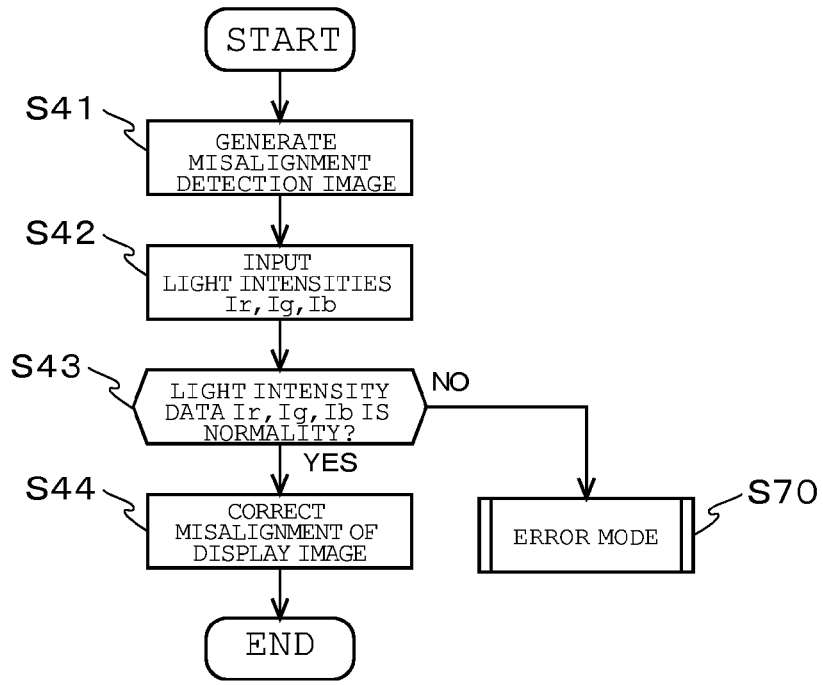
FIG. 10 is a flowchart of an image output checking process of the head-up display device for a vehicle of the invention.

In the MEMS mirror checking process S20, after correction of the horizontal driving signal and the vertical driving signal of the MEMS mirror 30 and error detection of the MEMS mirror 30 end, the CPU 401 starts the LD checking process S30 (FIG. 9).

In Step S31, the LD power supply means 103 powers on the LDs 11, 12, and 13, the LD output control means 101, and the LD current detection means 102 in response to a power-on signal from the CPU 401.

In Step S32, abnormality, such as overcurrent or short-circuiting, in the LD power supply means 103 is detected, and when it is determined to be abnormal, the process progresses to the error mode S70.

In Step S33, the CPU 401 reads test laser light output data recorded in the recording means 402 in advance and drives each of the LDs 11, 12, and 13 through the LD control unit 200 (test laser light output means).

Test laser light is laser light which is output to detect a current in each of the LDs 11, 12, and 13 or light intensity of each LD, and may not have image data. A maximum current value which is used in the head-up display device 1 for a vehicle may be provided to output test laser light. With this configuration, it is possible to check an error at the time of the output the maximum light intensity of the laser light R, G, and B, and to confirm safety within a range to be used. In this embodiment, although the first light intensity detection means 20 is a color sensor, when the first light intensity detection means 20 is a photodiode, in regard to test laser light, the red laser light R, the green laser light G, and the blue laser light B are output individually for every time to measure light intensity.

In the interim, in Step S34, the LD current detection means 102 detects the current value in each of the LDs 11, 12, and 13, and LD current data representing the current value is output to the LD output control means 101.

In Step S35, the LD output control unit 101 performs determination about normality/abnormality of LD current data, and when it is determined to be abnormal, process progresses to the error mode S70.

In Step S36, the CPU 401 receives, as input, the light intensities Ir, Ig, and Ib of the LDs 11, 12, and 13 detected by the color sensor (first light intensity detection means) 20 as digital signal through an A/D converter.

In Step S37, the CPU 401 compares light intensity data Ir, Ig, and Ib of the LDs 11, 12, and 13 with the color sensor normal operation determination reference value recorded in the recording means 402 in advance to perform determination about whether or not light intensity is within a normal operation range. When it is determined to be abnormal, the CPU 401 progresses to the error mode S70.

In Step S38, the CPU 401 compares detected LD current data or light intensity data (first light intensity) with a reference current value or first reference light intensity recorded in the recording means 402 in advance, calculates a current correction value such that each of the LDs 11, 12, and 13 has desired light intensity, records the current correction value in the recording means 402, and corrects the driving current of each of the LDs 11, 12, and 13.

(Image Output Checking Process)

When the operation checking of the LDs 11, 12, and 13 ends, in a detection image output checking process S40, the general control unit 400 performs correction of the position at which the display image M is projected on the screen 40 and error detection of the second light intensity detection means 50.

In Step S41, the CPU 401 reads misalignment detection image data recorded in the recording means 402 in advance and drives the LDs 11, 12, and 13 and the MEMS mirror 30 based on misalignment detection image data to generate a misalignment detection image on the screen 40 (misalignment detection image generation means).

In Step S42, the photodiode (second light intensity detection means) 50 detects light intensity of the misalignment detection image, performs A/D conversion, and outputs the result to the CPU 401.

In Step S43, the CPU 401 compares light intensity data from the photodiode 50 with a photodiode normal operation determination reference value recorded in the recording means 402 in advance to perform determination about whether or not light intensity is within the normal operation range. When it is determined to be abnormal, the CPU 401 progresses to the error mode S70.

In Step S44, the CPU 401 compares detected second light intensity data with second reference light intensity recorded in the recording means 402 in advance, calculates the misalignment correction value such that the misalignment detection image is at a desired position, records the misalignment correction value in the recording means 402, and performs misalignment correction of the display image (misalignment correction value recording means).

(Origin Detection Confirmation Process)

After the self-checking process SC (the MEMS mirror checking process S20, the LD checking process, and the output image checking process S40) ends without abnormality, the CPU 401 confirms whether or not the concave mirror 70 reaches the second invisible position (origin position) Y by the concave mirror origin detection unit 303, and holds the state until origin detection is performed by the concave mirror origin detection unit 303 (Step S50).

Before the self-checking process SC ends, when the concave mirror 70 reaches the second invisible position (origin position) Y, the CPU 401 stops the motor 301 through the motor driving unit 302.

Figure 12:
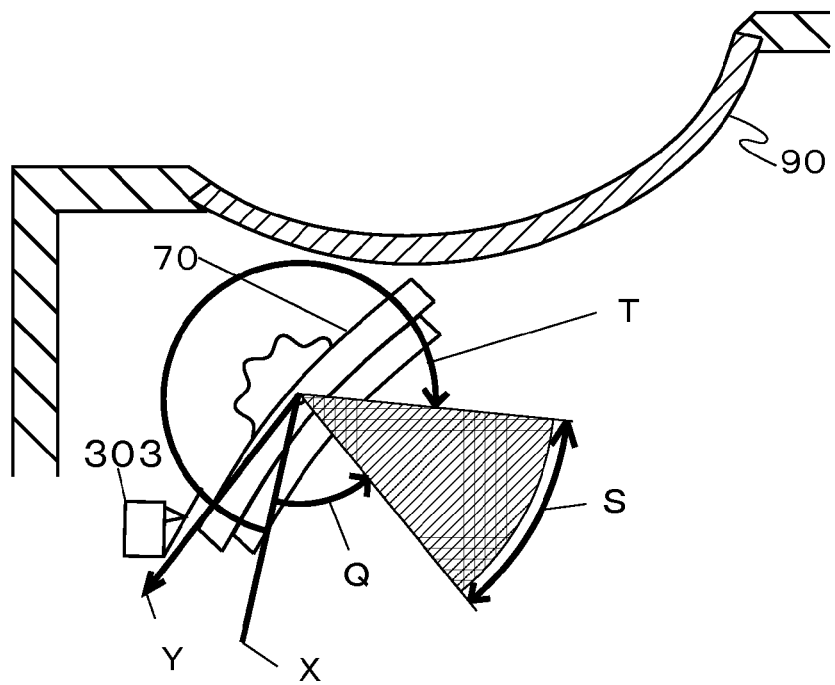
FIG. 12 is an explanatory view of a second invisible position in the head-up display device for a vehicle of the invention.
Figure 13:
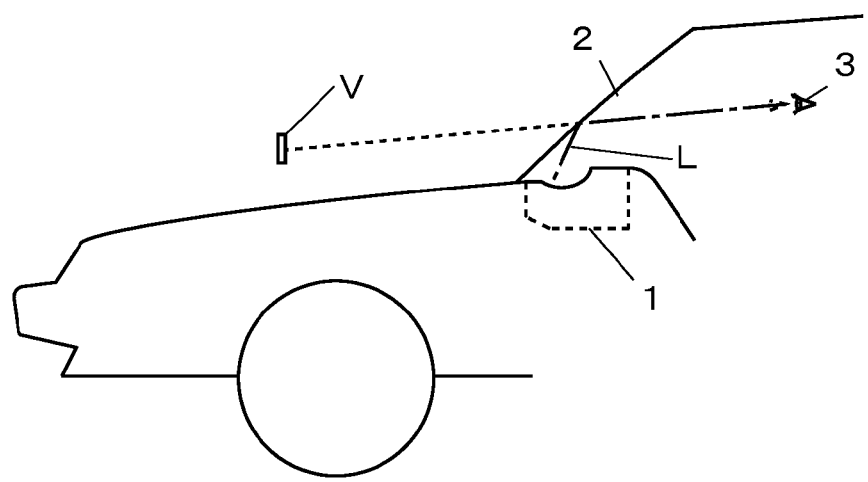
FIG. 13 is an overview diagram of the head-up display device for a vehicle of the invention.

As shown in FIG. 12, it is preferable that the second invisible position (origin position) Y which is detected by the concave mirror origin detection unit 303 as the origin is not an angle region at the shortest distance Q from the first invisible position (Parking position (hereinafter, referred to as P position)) X to the visible position angle region S, but is an angle region in an opposite direction T. With this configuration, during an LD test, it is possible to adjust the concave mirror 70 to a position at which laser light is less likely to be reflected to the outside.

The CPU 401 receives the origin reaching signal from the concave mirror origin detection unit 303 as input, drives the motor 301 through the motor driving unit 302 after confirming that the motor 301 is stopped, and regulates the concave mirror 70 to a normal position as a visible position at which the concave mirror 70 irradiates the display light L from the light transmission portion 90 to the outside. Although the normal position is an angle at which the virtual image V can be visually recognized by the vehicle driver most satisfactorily, and a standard angle recorded in the recording means 402 in advance, an optimum angle in conformity with the vehicle driver may be recorded in the recording means 402 and the angle may be set as the normal position.

When the first invisible position (Parking position (hereinafter, referred to as P position)) X is set as the origin, it is not necessary to perform origin detection, and during the self-checking process SC, the concave mirror 70 is held at the first invisible position (Parking position (hereinafter, referring to as P position)) X even if the start switch is turned on.

(Error Mode Process)

Figure 11:
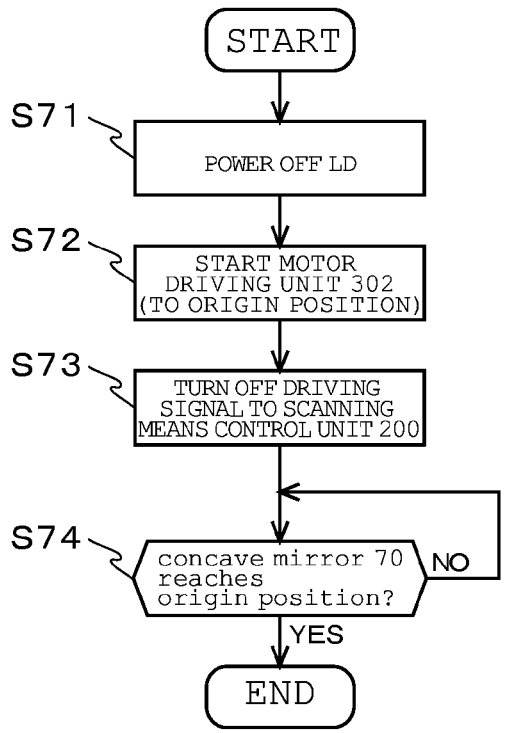
FIG. 11 is a flowchart of an error process of the head-up display device for a vehicle of the invention.

Next, the error mode process S70 will be described referring to FIG. 11.

If the error mode process S70 starts, in Step S71, the CPU 401 blocks power supply to the LDs 12, 13, and 14 through the LD power supply means 103.

In Step S72, the CPU 401 moves the concave mirror 70 in the origin direction through the motor driving unit 302.

In Step S73, the CPU 401 turns off the driving signal to the scanning means control unit 200.

In Step S74, the general control unit 400 detects whether or not the concave mirror 70 is stopping at the origin, and holds this state until the concave mirror 70 reaches the origin and stops.

When it is confirmed that the concave mirror 70 stops at the origin, the self-checking SC starts.

With the above-described configuration, after the start switch of the vehicle is turned on, the light emitting means 10 emits test laser light as driving for a test, and a current value in the light emitting means 10 or light intensity of laser light is detected. At least until the safety of the light emitting means 10 can be confirmed after test laser light is emitted, angle adjustment of the reflection means 70 is performed to prevent test laser light from being emitted to the outside, whereby it is possible to suppress the output of laser light directly to the outside.

INDUSTRIAL APPLICABILITY

The head-up display device for a vehicle and the self-checking method therefor according to the invention can be used as a head-up display device for a vehicle which is mounted in a vehicle and outputs a virtual image representing vehicle information to give notification of the vehicle information to a vehicle driver.

REFERENCE SIGNS LIST

1: head-up display device for vehicle
10: light emitting means
11: red LD
12: green LD
13: blue LD
14: condensing optical system
15: multiplexing means
20: color sensor (first light intensity detection means)
30: MEMS mirror (scanning means)
40: screen
50: photodiode (second light intensity detection means)
60: planar mirror
70: concave mirror (reflection means)
80: housing
90: light transmission portion
100: LD control unit
101: LD output control means
102: LD current detection means
103: LD power supply means
200: scanning means control unit
201: MEMS mirror driving means
202: mirror position detection means
300: reflection means control unit
301: motor (angle adjustment means)
302: motor driving unit
303: concave mirror origin detection unit
400: general control unit
401: CPU
402: recording means

The invention claimed is:

1. A head-up display device for a vehicle which projects an image from a light transmission portion, the head-up display device comprising:
    a housing which has the light transmission portion;
    light emitting means for outputting laser light;
    scanning means for scanning the laser light from the light emitting means to generate the image;
    reflection means for reflecting the image generated by the scanning means to project the image outside the housing;
    angle adjustment means for adjusting the reflection means at a desired angle;
    test laser light output means for causing the light emitting means to output test laser light based on test laser light output data recorded in the recording means in advance after a start switch of the vehicle is turned on;
    light source state detection means for detecting a current value in the light emitting means or first light intensity, which is light intensity of the test laser light, when the light emitting means emits the test laser light; and
    invisible position holding means for controlling the angle adjustment means such that the position of the reflection means is an invisible position at which the test laser light is reflected inside the housing at least until a predetermined condition is established after the light emitting means outputs the test laser light.

2. The head-up display device for a vehicle according to claim 1, further comprising:
    first invisible position adjustment means for performing angle adjustment of the reflection means to a first invisible position, which is the invisible position, when the start switch of the vehicle is turned off,
    wherein the invisible position holding means holds the position of the reflection means at the first invisible position.

3. The head-up display device for a vehicle according to claim 1, further comprising:
    first invisible position adjustment means for performing angle adjustment for the reflection means to a first invisible position, which is the invisible position, when the start switch of the vehicle is turned off,
    wherein the invisible position holding means performs angle adjustment for the position of the reflection means from the first invisible position to a second invisible position different from the first invisible position within the invisible position.

4. The head-up display device for a vehicle according to claim 2,
    wherein the angle adjustment means reads angle adjustment data recorded in the recording means in advance with a predetermined origin as a reference and performs angle adjustment for the reflection means to a desired position, and the origin is the first invisible position.

5. The head-up display device for a vehicle according to claim 3,
    wherein the angle adjustment means reads angle adjustment data recorded in the recording means in advance with a predetermined origin as a reference and performs angle adjustment for the reflection means to a desired position, and the origin is the second invisible position.

6. The head-up display device for a vehicle according to claim 3,
    wherein the second invisible position is a position in a direction opposite to the shortest direction from a visible position, at which the reflection means reflects the image in the light transmission portion direction, to the first invisible position.

7. The head-up display device for a vehicle according to claim 1, further comprising:
    current correction value recording means for comparing the current value or the first light intensity detected by the light source state detection means with a reference current value or a first reference light intensity for a model recorded in the recording means in advance to obtain a current correction value and recording the current correction value in the recording means.

8. The head-up display device for a vehicle according to claim 1, further comprising:
    test scanning means for driving the scanning means for a test based on test scanning data recorded in the recording means in advance after the start switch of the vehicle is turned on;
    driving frequency detection means for detecting a horizontal driving frequency and a vertical driving frequency of the scanning means when the scanning means is driven for the test; and
    frequency correction value recording means for comparing the horizontal driving frequency and the vertical driving frequency detected by the driving frequency detection means with a reference horizontal driving frequency and a reference vertical driving frequency for models recorded in the recording means in advance to obtain a frequency correction value and recording the frequency correction value in the recording means.

9. The head-up display device for a vehicle according to claim 1,
    misalignment detection image generation means for driving the light emitting means and the scanning means based on misalignment detection image data recorded in the recording means in advance after the start switch of the vehicle is turned on and generating a misalignment detection image on a screen;

second light intensity detection means for detecting second light intensity which is light intensity of a predetermined location of the misalignment detection image; and misalignment correction value recording means for comparing the second light intensity detected by the second light intensity detection means with a second reference light intensity for a model recorded in the recording means in advance to obtain a misalignment correction value and recording the misalignment correction value in the recording means.

10. A self-checking method in a head-up display device for a vehicle which scans laser light output from light emitting means by scanning means to generate an image, and reflects and projects the image by reflection means, the self-checking method comprising:

a test laser light output step of causing the light emitting means to output test laser light based on test laser light output data recorded in recording means in advance after a start switch of the vehicle is turned on;

a light source state detection step of detecting a current value in the light emitting means or first light intensity of the test laser light when the light emitting means outputs the test laser light;

a current correction value recording step of comparing the current value or the first light intensity detected in the light source state detection step with a reference current value or first reference light intensity for a model recorded in the recording means in advance to obtain a current correction value and recording the current correction value in the recording means; and an invisible position holding step of controlling angle adjustment means such that the position of the reflection means is an invisible position, at which the test laser light is reflected inside a housing at least until a predetermined condition is established after the light emitting means outputs the test laser light.

11. The self-checking method in a head-up display device for a vehicle according to claim 10, further comprising:

before the test laser light output step after the start switch of the vehicle is turned on, a test scanning step of driving the scanning means for a test based on test scanning data recorded in the recording means in advance;

a frequency detection step of detecting a horizontal driving frequency and a vertical driving frequency of the scanning means when the scanning means is driven for a test;

a frequency correction value recording step of comparing the horizontal driving frequency and the vertical driving frequency detected by the frequency detection means with a reference horizontal driving frequency and a reference vertical driving frequency for models recorded in the recording means in advance to obtain a frequency correction value and recording the frequency correction value in the recording means.

12. The self-checking method in a head-up display device for a vehicle according to claim 10, further comprising:

after the test laser light output step, a misalignment detection image generation step of driving the light emitting means and the scanning means based on misalignment detection image data recorded in the recording means in advance and generating a misalignment detection image on a screen;

a second light intensity detection step of detecting second light intensity which is light intensity of a predetermined location of the misalignment detection image; and a misalignment correction value recording step of comparing the second light intensity detected by the second light intensity detection means with a second reference light intensity for a model recorded in the recording means in advance to obtain a misalignment correction value and recording the misalignment correction value in the recording means.

* * * * *